US012562612B2

(12) United States Patent
Martin et al.

(10) Patent No.: US 12,562,612 B2
(45) Date of Patent: Feb. 24, 2026

(54) END WINDING SUPPORT BRACKET

(71) Applicant: GENERAL ELECTRIC COMPANY, Schenectady, NY (US)

(72) Inventors: Matthew R. Martin, Schenectady, NY (US); Philip M. Cioffi, Schaghticoke, NY (US); John R. Yagielski, Scotia, NY (US); Zhang Wei, Clifton Park, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 675 days.

(21) Appl. No.: 17/960,516

(22) Filed: Oct. 5, 2022

(65) Prior Publication Data

US 2024/0120795 A1     Apr. 11, 2024

(51) Int. Cl.
| *H02K 3/48* | (2006.01) |
| *H02K 3/32* | (2006.01) |
| *H02K 3/34* | (2006.01) |
| *H02K 3/52* | (2006.01) |

(52) U.S. Cl.
CPC ............. *H02K 3/522* (2013.01); *H02K 3/325* (2013.01); *H02K 3/345* (2013.01); *H02K 3/48* (2013.01)

(58) Field of Classification Search
CPC ........ H02K 3/522; H02K 3/325; H02K 3/345; H02K 3/48; H02K 3/50; H02K 3/505
See application file for complete search history.

(56) References Cited

U.S. PATENT DOCUMENTS

| 9,419,489 B2 | 8/2016 | Littlejohn et al. |
| 2020/0106319 A1 | 4/2020 | Tategata et al. |
| 2021/0408862 A1 | 12/2021 | Jensen et al. |

FOREIGN PATENT DOCUMENTS

| JP | 2007110797 A | * | 4/2007 | .............. B60L 50/16 |
| JP | 2016101002 A | | 5/2016 | |
| JP | 2020054028 A | * | 4/2020 | |
| JP | 2021166423 A | | 10/2021 | |
| WO | 2018161214 A1 | | 9/2018 | |

OTHER PUBLICATIONS

Kawakami (JP 2007110797 A) English Translation (Year: 2007).*
Seno (JP 2020054028 A) English Translation (Year: 2020).*
International Search Report and Written Opinion received for PCT/US2023/075469 on Jan. 25, 2024; 6 pps.

* cited by examiner

*Primary Examiner* — Tulsidas C Patel
*Assistant Examiner* — Robert E Mates
(74) *Attorney, Agent, or Firm* — Armstrong Teasdale LLP

(57)     ABSTRACT

Disclosed herein is a bracket connectable to a stator core of an electrical machine. The bracket includes a comb portion having a plurality of teeth arranged in at least one row such that an indentation is defined between each pair of adjacent teeth. Each indentation is sized to receive a portion of a busbar therein. The bracket further includes a tab sized and shaped to be received within a mounting recess defined in the stator core, and an arm extending between the comb portion and the tab such that the comb portion is offset from the tab.

20 Claims, 14 Drawing Sheets

END WINDING SUPPORT BRACKET

FIELD OF THE DISCLOSURE

The field of the disclosure relates generally to electric machines, and more particularly, to support structures used with electric machines.

BACKGROUND

The stator core of an electric machine includes conductive elements, such as stator winding coils, that are electrically coupled together via conductors extending externally to the stator core. For example, end winding leads may be electrically connected to busbars that span multiple end windings across the machine's circumference. During operation, the electric machine may be subjected to a variety of loads, including both electromagnetic forces generated within the machine and external forces imparted on the machine during its operation. Accordingly, the conductive elements outside of the stator core must be mechanically supported and constructed to withstand any vibrational loading, shock loading, thermal growth, or other loads that may be imposed on the electric machine.

In many applications of known electric machines, and particularly in aerospace applications, it is essential to minimize the physical size and weight of the electric machine. Thus, there is a need for a support structure for use with an electric machine, wherein that structure will support conductive elements outside of the stator core without significantly adding to the overall size and weight of the electric machine.

SUMMARY

Disclosed herein is an electrical machine including a rotor and a stator magnetically coupled to the rotor. The stator includes a stator core having an exterior surface and a plurality of circumferentially-spaced mounting recesses defined therein, and a plurality of stator windings coupled to a radial inner surface of the stator core. Each stator winding includes an end winding portion that extends outward from an axial end of the stator core, and at least one lead that extends from the end winding portion. The electric machine also includes at least one busbar electrically coupled to at least two of the leads, and a bracket. The bracket includes a comb portion having a plurality of teeth arranged in at least one row such that an indentation is defined between each pair of adjacent teeth. Each indentation is sized and oriented to receive a portion of the busbar therein. The bracket further includes a tab that is sized and shaped to be received within a respective one of the plurality of mounting recesses, and an arm that extends between the comb portion and the tab such that the comb portion is offset from the tab.

Further disclosed herein is a bracket that is connectable to a stator core of an electrical machine. The bracket includes a comb portion having a plurality of teeth arranged in at least one row such that an indentation is defined between each pair of adjacent teeth. Each indentation is sized and oriented to receive a portion of a busbar therein. The bracket also includes a tab that is sized and shaped to be received within a mounting recess defined in the stator core, and an arm extending between the comb portion and the tab such that the comb portion is offset from the tab.

Further disclosed herein is a method of assembling an electric machine including a rotor, a stator, a busbar, and a bracket. The bracket includes a comb portion having a plurality of teeth arranged in at least one row such that an indentation is defined between each pair of adjacent teeth. The method includes positioning a tab of the bracket within a mounting recess defined in an exterior surface of a stator core of the stator, inserting a portion of the busbar within one of the plurality of indentations, coupling a stator winding to a radial inner surface of the stator core, and coupling the busbar to a lead extending from an end winding portion of the stator winding.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

The following detailed description illustrates exemplary end winding support brackets and methods of their use with electric machines by way of example and not by way of limitation. The description should enable one of ordinary skill in the art to make and use the brackets, and the description describes several exemplary embodiments of brackets. An exemplary bracket is described herein in conjunction with the assembly of an electrical machine. However, it is contemplated that the bracket has general application to a broad range of systems in a variety of fields other than electrical machines.

Figure 1:
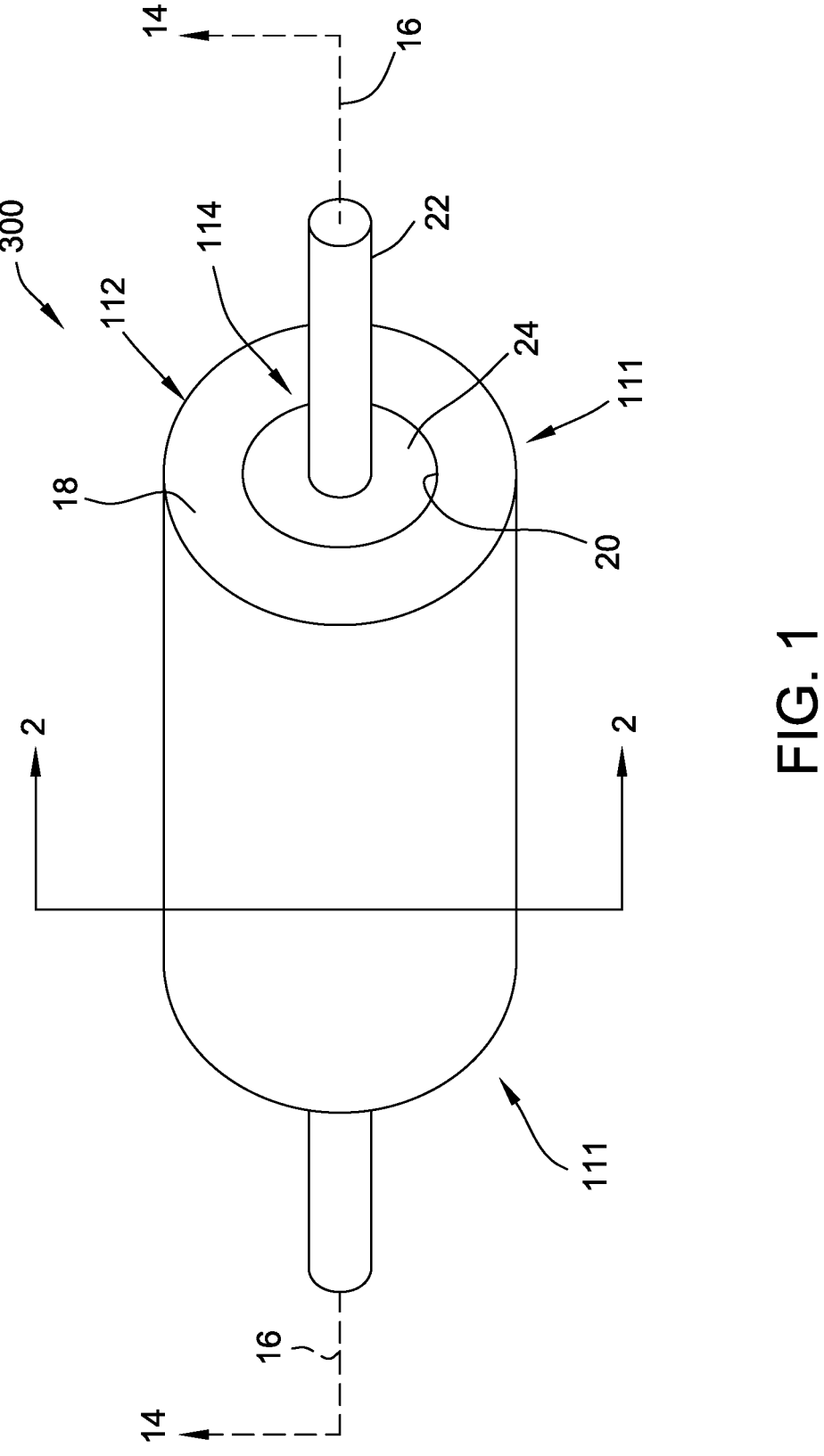
FIG. 1 is an exploded perspective view of an exemplary electric machine.

FIG. 1 is a perspective view of an exemplary electric machine 300. In the exemplary embodiment, the electric machine 300 includes a stator 112 and a rotor 114, which are magnetically coupled and coaxially aligned about a central longitudinal axis 16 of the electric machine 300. The electric machine 300 may be an electric motor, wherein the rotor 114 rotates relative to the stator 112 to convert electrical energy to mechanical energy. In further embodiments, the electric machine 300 may be an electric generator, wherein the relative rotation between the rotor 114 and the stator 112 converts mechanical energy to electrical energy. In still further embodiments, the electric machine 300 may be any other type of rotating electric machine, for example and without limitation, a synchronous machine, a multi-phase electric machine, an electric machine with concentrated windings, an electric machine with distributed windings, a reluctance machine, an induction machine, a wound field machine, a salient pole electric machine, an internal permanent magnet (IPM) machine, an electric machine with permanent magnets arranged differently than an IPM machine (e.g., surface PM machines and/or the like), and/or any other suitable electric machine.

The stator 112 includes a stator core 18 that extends between axial ends 111 and that includes a central opening 20 that extends along the central longitudinal axis 16. The rotor 114 extends a distance along the central longitudinal axis 16, and includes a shaft 22 and a rotor core 24 mounted to the shaft 22. The shaft 22 rotates about the central longitudinal axis 16 relative to the stator core 18. The rotor core 24 is rotatably coupled to the shaft 22 such that the rotor core 24 rotates about the central longitudinal axis 16 with the shaft 22.

In the exemplary embodiment, the rotor 114 extends within the central opening 20 of the stator core 18 and is rotatable relative to the stator core 18 within the central opening 20. That is, the stator core 18 of the electric machine 300 is sized to extend about the rotor 114 such that the rotor 114 can rotate within the stator 112. In further embodiments, the rotor 114 may be sized to extend around the stator 112 and rotate around the stator 112.

Figure 2:
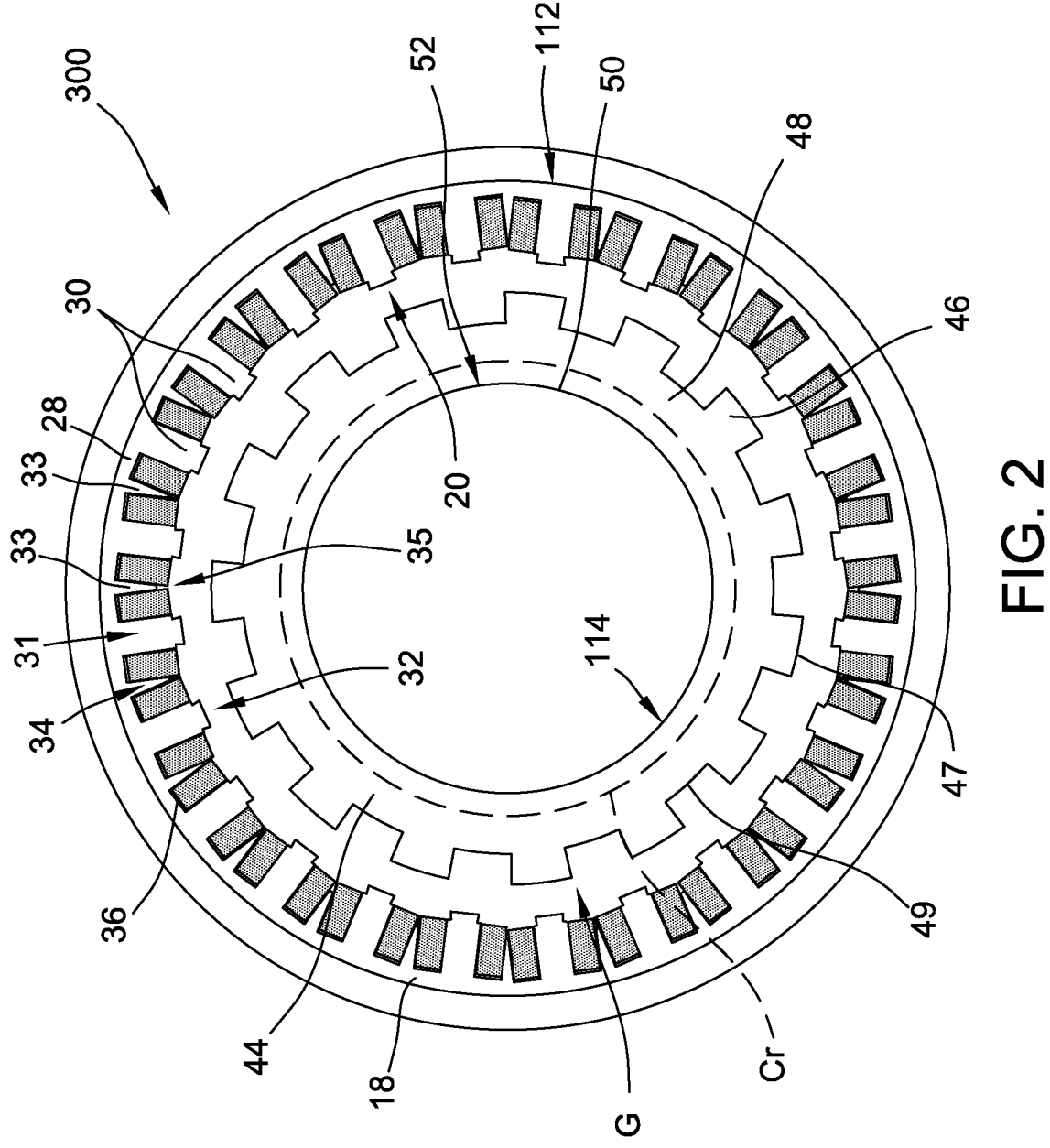
FIG. 2 is a cross-sectional view of the exemplary electric machine shown in FIG. 1 taken along line 2-2.
Figure 3:
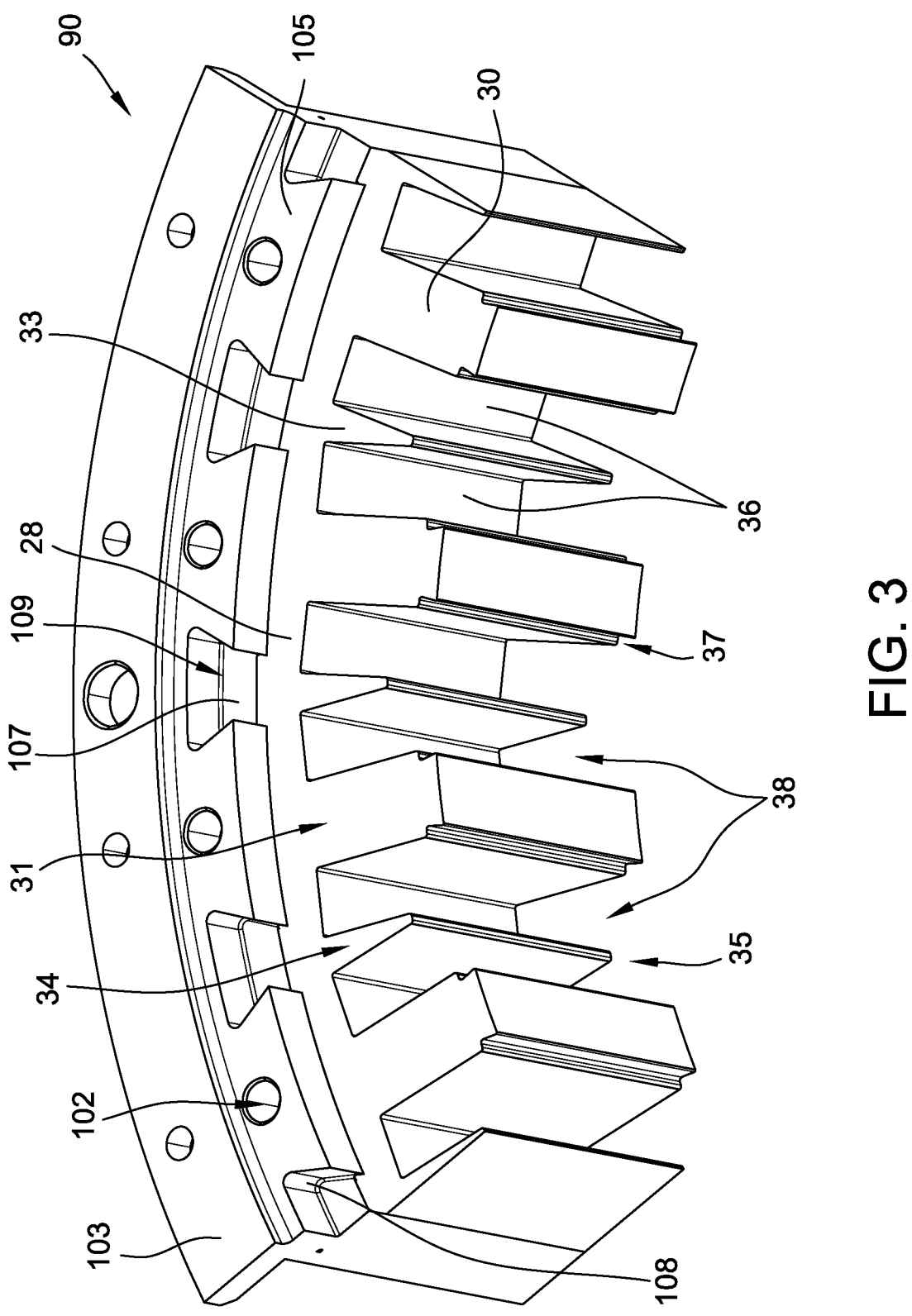
FIG. 3 is a perspective view of an exemplary wedge portion of an axial end of a stator core of the electric machine.
Figure 4:
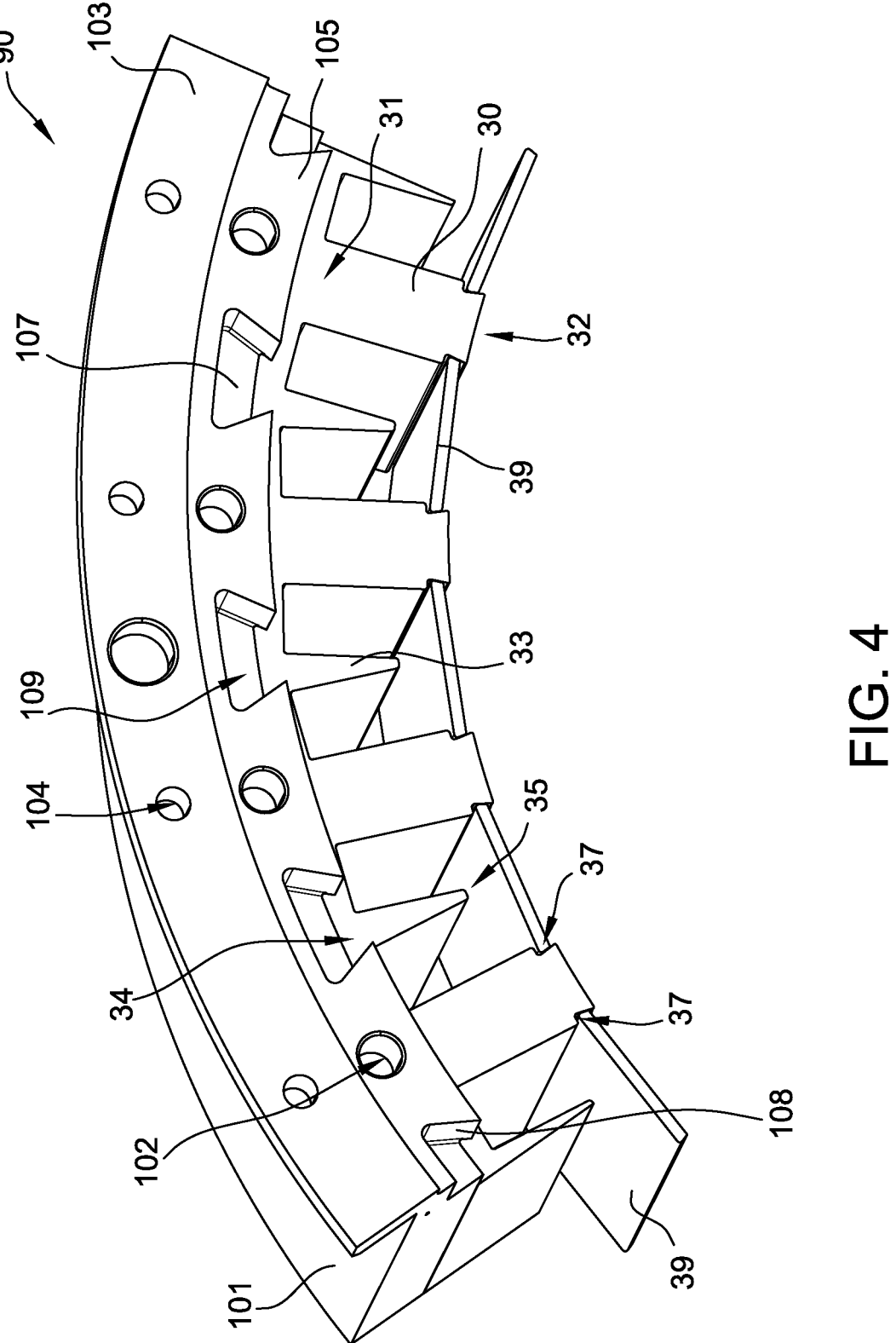
FIG. 4 is another perspective view of the exemplary wedge portion of the axial end of a stator core of the electric machine shown in FIG. 3.

FIG. 2 is a cross-sectional view of the exemplary electric machine 300 shown in FIG. 1 taken along line 2-2 (shown in FIG. 1). In particular, the cross-sectional view of FIG. 2 illustrates both the stator 112 and the rotor 114 of the electric machine 300. In the exemplary embodiment, the stator core 18 includes a stator base 28, a plurality of circumferentially-spaced stator teeth 30, and a plurality of circumferentially-spaced partitions 33, wherein each stator tooth 30 and partition 33 extends radially inward from the stator base 28. With additional reference to FIGS. 3 and 4, each stator tooth 30 extends from a first end 31, adjacent the stator base 28, to a second, free end 32. The second end 32 of each stator tooth 30 may partially define the central opening 20 of the stator core 18. In some embodiments, the second ends 32 of each stator tooth 30 are connected together. Each stator tooth 30 may also define at least one wedge retention groove 37 proximate the second end 32 thereof. Each wedge retention groove 37 extends along an axial length of each stator tooth 30 between the axial ends 111 of the stator core 18. A plurality of wedges 39 are each shaped and sized to be received in, and retained by, a respective pair of wedge retention grooves 37 defined between an adjacent pair of stator teeth 30. Each wedge 39 secures a stator conductor 40 within a respective raceway 38. The raceways 38 will be discussed in more detail below.

Each partition 33 extends from a first end 34 adjacent to the stator base 28 to a second, free end 35. The stator teeth 30 and partitions 33 are circumferentially-spaced about the stator base 28 in an alternating pattern such that a partition 33 is positioned between each pair of circumferentially-adjacent stator teeth 30, and such that a stator tooth 30 is positioned between each pair of circumferentially-adjacent partitions 33. The stator core 18 may include any number of stator teeth 30 and partitions 33 that enables the electric machine 300 to function as described herein.

The interior surface of the stator base 28 between each adjacent stator tooth 30 and partition 33 forms a radial inner surface 36 (shown in FIG. 3) of the stator core 18. The raceway 38 is defined in part by the radial inner surface 36, each pair of circumferentially-adjacent partitions 33, and the respective stator tooth 30 disposed therebetween. Each raceway 38 is shaped and sized to receive a stator conductor 40 therein. Each stator conductor 40 extends longitudinally through the stator core 18 and is coupled to the radial inner surface 36 thereof. The stator core 18 may include the same number of stator conductors 40 as raceways 38, or, alternatively, it may include fewer stator conductors 40 than raceways 38, such that at least one raceway 38 does not receive a stator conductor 40 therein. The rotor 114 includes the shaft 22 (shown in FIG. 1) and the rotor core 24.

The rotor core 24 is rotatable about the central longitudinal axis 16 relative to the stator 112. In the exemplary embodiment, the rotor core 24 includes a rotor base 44, a plurality of magnetic segments 46 extending radially outward from the rotor base 44, and a plurality of non-magnetic segments 48 extending radially outward from the rotor base 44. In other embodiments, the segments 46 and 48 extend radially inward from the rotor base 44.

The magnetic segments 46 and the non-magnetic segments 48 are arranged in a circumferentially-spaced alternating pattern of magnetic segments 46 and non-magnetic segments 48 around a rotor circumference $C_r$ of the rotor core 24. In other words, the magnetic segments 46 are spaced radially about the central longitudinal axis 16 such that the magnetic segments 46 are circumferentially spaced a distance therefrom, such that the non-magnetic segments 48 extend between circumferentially-adjacent magnetic segments 46 spaced about the rotor circumference Cr of the rotor core 24. In the exemplary embodiment, the rotor 114 is a toothed rotor wherein the magnetic segments 46 define rotor teeth 45 of the rotor core 24.

The rotor base 44 includes a radial inner rotor surface 50 that defines a central opening 52 within the rotor core 24. An outer circumference of the rotor core 24 is defined by respective end surfaces 47 and 49 of the magnetic and non-magnetic segments 46 and 48. An air gap G is defined between the outer circumference of the rotor core 24 and the second ends 32 of each stator tooth 30 of the stator core 18. The rotor base 44 may include one or more mortices (not shown) that are each sized and oriented to receive a corresponding tenon (not shown) extending from the shaft 22 therein for use in mounting the rotor core 24 to the shaft 22. Other arrangements for mounting the rotor core 24 to the shaft 22 may be provided in addition to, or in the alternative to, the mortices and tenons.

The rotor core 24 may be formed from one or more stacks of a plurality of laminations, or alternatively, may be formed as a single piece of material. The rotor base 44 of the rotor core 24 may be fabricated from a non-magnetic material and may be integrally formed with the magnetic segments 46. Alternatively, or additionally, the rotor base 44 may be integrally formed with the non-magnetic segments 48. For example, when the rotor core 24 is formed from a stack of laminations, the rotor base 44 of each lamination, or layer, within the stack may be integrally formed with the magnetic segments 46 and/or the non-magnetic segments 48 of the lamination. Moreover, and for example, in embodiments wherein the rotor core 24 is formed as a single piece of material, the rotor base 44 is a single piece of material that is integrally formed from a magnetic material and that includes all of the magnetic segments 46 and non-magnetic segments 48 of the rotor core 24. In the exemplary embodiment, the magnetic segments cooperate with the rotor base 44 to form the rotor 114 as a toothed rotor. In other words, in such an embodiment, the rotor base 44 carries magnetic flux. The toothed rotor structure of the rotor 114, whether constructed from a stack of laminations or from a single piece of material, distinguishes the rotor 114 from a "segmented" rotor that includes a rotor core having magnetic segments that are magnetically isolated, or segmented, from the rotor base and from each other. In the exemplary embodiment, the stator 112 and/or the rotor 114 may include a permanent magnet. In some alternative embodiments, the rotor 114 is a segmented rotor.

The rotor core 24 may include any number of magnetic segments 46 and/or non-magnetic segments 48. Moreover, the rotor core 24 may include any number of rotor teeth 45. In one embodiment, the rotor core 24 includes the same number of rotor teeth 45 as the stator core 18 includes stator teeth 30. Alternatively, the stator core 18 may include more or less stator teeth 30 than the number of rotor teeth 45 included in the rotor core 24. In the exemplary embodiment, the rotor core 24 includes fourteen rotor teeth 45, and the electric machine 300 includes more stator teeth 30 than rotor teeth 45.

FIGS. 3-7 and 13 each illustrate an exemplary wedge portion 90 of an axial end 111 of the stator core 18. The illustrated wedge portion 90 may be representative of any circumferential portion of the stator core 18 at either axial end 111 thereof, and it is to be understood that each wedge portion 90 included in each axial end 111 of the stator core 18 may include identical features and components, or may include different features and components than those illustrated in FIGS. 3-7 and 13.

In the exemplary embodiment, the stator core 18 includes a radial outer surface 1 (FIG. 4) and a flange 103 that circumscribes the stator core 18 and extends radially outward from the radial outer surface 101. In the exemplary embodiment, the flange 103 defines at least one mounting hole 104 therein that is shaped and sized to receive a fastener (not shown) therethrough. The stator core 18 also includes an exterior surface 105 that extends substantially perpendicularly from the radial inner surface 36 of the stator core 18. In addition, the stator core 18 includes a plurality of recessed surfaces 107 and a plurality of recess sidewalls 108 that each extend generally axially. Each recess sidewall 108 extends from the exterior surface 105 to a respective recessed surface 107. Each recessed surface 107 and corresponding recess sidewall 108 define a mounting recess 109 that extends into the stator core 18 from the exterior surface 105. The plurality of mounting recesses 109 are spaced circumferentially about each axial end 111 of the stator core 18. In the exemplary embodiment, each mounting recess 109 is dovetail-shaped. In alternative embodiments, each mounting recesses 109 may have any other suitable shape that enables the electric machine 300 to function as described herein.

The exterior surface also includes a plurality of first apertures 102 defined therein. In the exemplary embodiment, the first apertures 102 and mounting recesses 109 are circumferentially-spaced about the exterior surface 105 of the stator core 18 such that a first aperture 102 is defined between each pair of adjacent mounting recesses 109, and such that a mounting recess 109 is defined between each pair of circumferentially-adjacent first apertures 102. In alternative embodiments, depending on the design of stator core 18, at least some circumferentially-spaced pairs of mounting recesses 109 do not include a first aperture 102 defined between them.

Figure 5:
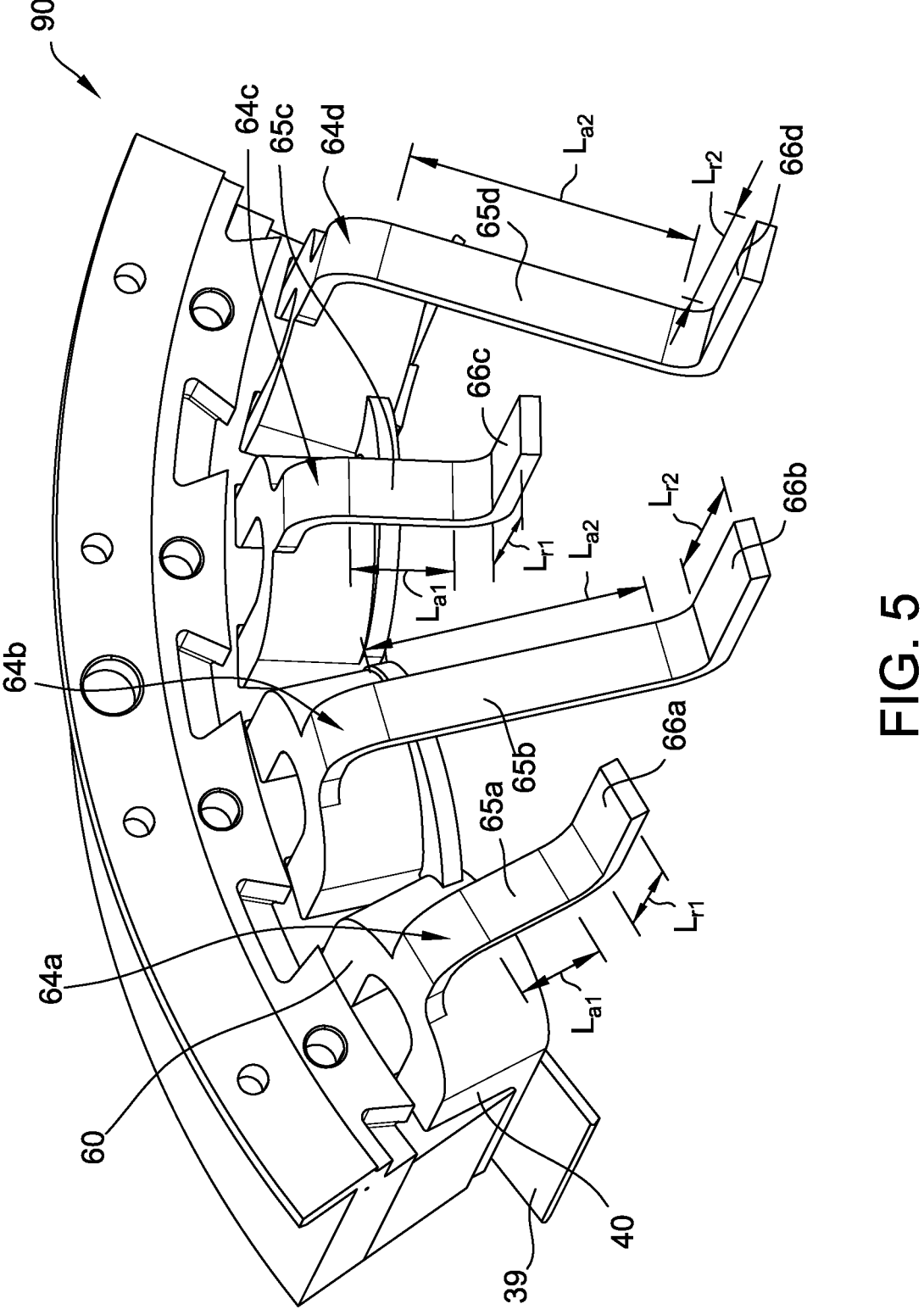
FIG. 5 is another perspective view of the exemplary wedge portion shown in FIG. 4 further illustrating a plurality of end winding portions.

FIG. 5 is a perspective view of a portion of the stator core 18 and includes a plurality of stator conductors 40 received within a respective raceway 38 (shown in FIG. 2). In the exemplary embodiment, the stator conductor 40 is a stator winding 40 that is formed by wrapping a plurality of wires (not shown) about one of the stator teeth 30 and between adjacent partitions 33 in a raceway configuration. That is, the wires enable the stator winding 40 to extend longitudinally through the stator core 18 in a direction that is substantially parallel to the central longitudinal axis 16. Moreover, the wires are looped around both lateral sides (not shown) of the stator tooth 30 and around an end (not shown) of the stator tooth 30 at each axial end 111 of the stator core 18. The plurality of wedges 39 secure each respective stator winding 40 within a respective raceway 38.

In some embodiments, the stator windings 40 may include one or more direct current (DC) windings and/or one or more alternative current (AC) windings. In other embodiments, the stator windings 40 may include copper windings, Litz wire windings, fractional-slot concentrated windings (not shown) and/or any other suitable type of stator winding. Each stator winding 40 may be, or may represent, any number of phases, such as, but not limited to, a single phase or three phases. In further embodiments, the stator conductor may be a rigid conductor having a similar shape.

The portion of each stator winding 40 that loops around the end of the stator tooth 30 forms an end winding portion 60 that extends outward from the axial end 111 of the stator core 18. Ends (not shown) of the plurality of wires that form each stator winding 40 extend axially outward from the end winding portion 60 to form a lead 64. The plurality of wires in each lead 64 may be brazed together to form a solid, unitary lead, or they may be loosely bundled together. In some embodiments, each lead 64 is flexible and can be bent and/or manipulated into multiple configurations or orientations. In further embodiments, the lead 64 is rigid and fixed in a single configuration.

The exemplary wedge portion 90 illustrated in FIG. 5 includes four end winding portions 60 with first, second, third, and fourth leads 64a-64d. Each lead 64a-d includes a radial portion 65a-d that extends radially inwardly towards the central longitudinal axis 16, and an axial portion 66a-d that extends axially away from the stator core 18 such that each portion 66a-d is substantially parallel to the central longitudinal axis 16. In the exemplary embodiment, the first and third leads 64a and 64c are formed identically, and the second and fourth leads 64b and 64d are formed identically with dimensions that are different from those of 64a and 64c. That is, the radial portions 65a and 65c of the respective first and third leads 64a and 64c each have a first radial length $L_{r1}$, and the radial portions 65b and 65d of the respective second and fourth leads 64b and 64d each have a second radial length $L_{r2}$ that is longer than the first radial length $L_{r1}$. Similarly, the axial portions 66a and 66c of the respective first and third leads 64a and 64c have a first axial length $L_{a1}$, and the axial portions 66b and 66d of the respective second and fourth leads 64b and 64d have a second axial length $L_{a2}$ that is longer than the first axial length $L_{a1}$. In other embodiments, all leads 64a-64d may have substantially the same dimensions.

In some embodiments, the stator core 18 also includes a plurality of slot liners (not shown) that are sized and oriented to be received within a corresponding raceway 38. The slot liners may be constructed from a nonconductive material such that the stator windings 40 are electrically isolated from the stator core 18. Each slot liner is positioned between the radial inner surface 36 of the stator core 18 and a stator winding 40, and extends longitudinally between the axial ends of the stator core 18.

Figure 6:
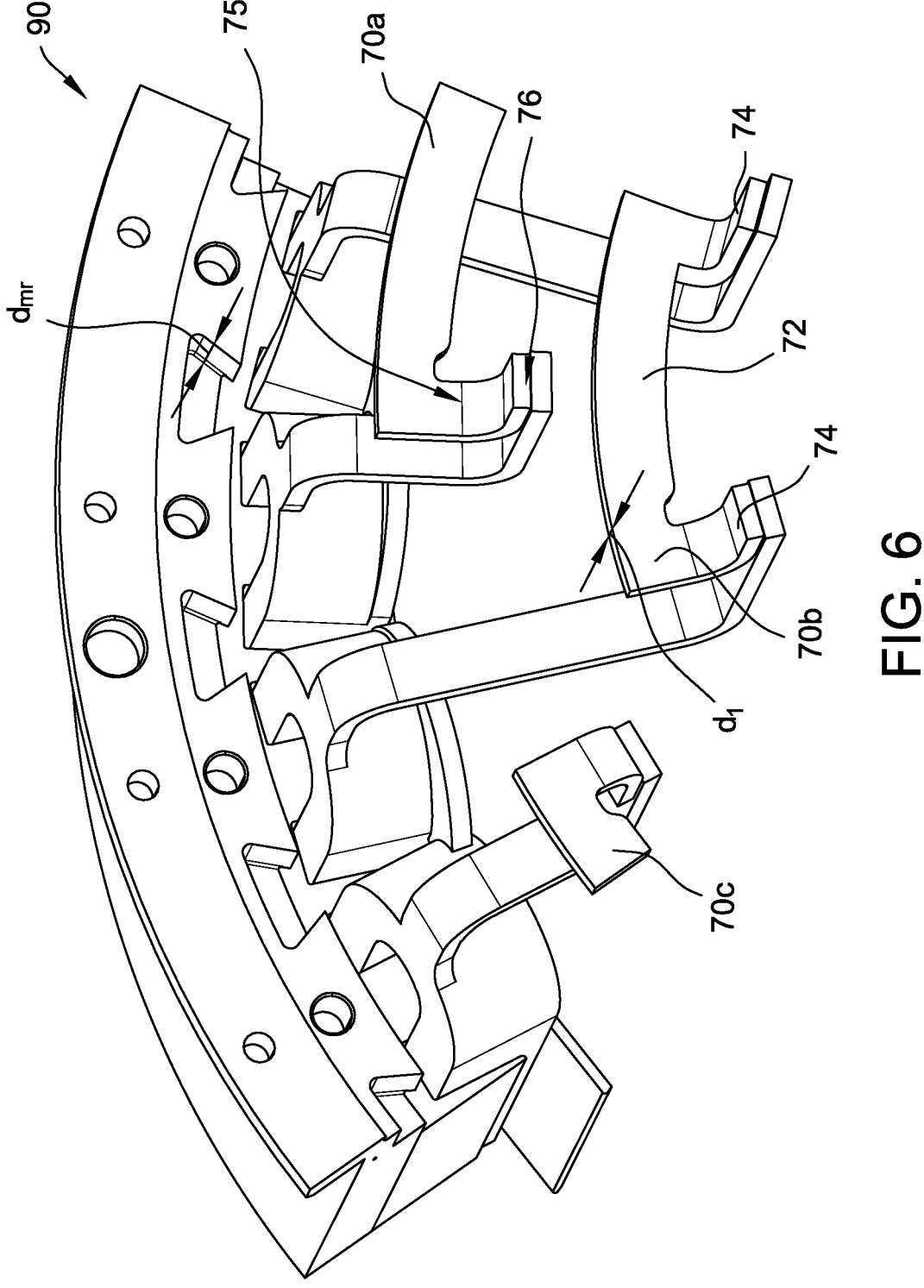
FIG. 6 is another perspective view of the exemplary wedge portion shown in FIG. 5 further illustrating a plurality of busbars.

With reference to FIG. 6, the electric machine 300 also includes at least one busbar 70 that is electrically coupled to at least two leads 64. In the exemplary embodiment, three busbars 70a-c are illustrated, but the electric machine 300 may include any suitable number of busbars 70 that enables the electric machine 300 to function as described herein. Each busbar 70 may include an arcuately-shaped circumferential portion 72 and at least two axial tabs 74. Each circumferential portion 72 has a depth $d_1$ and a width $w_1$, and extends a first arcuate length $AL_1$ that enables busbar 70 to extend between a pair of circumferentially-adjacent axial tabs 74. In other embodiments, the circumferential portion 72 may extend circumferentially beyond one or both of the axial tabs 74. Moreover, the circumferential portion 72 may extend substantially linearly between the at least two axial tabs 74, or alternatively it may be formed with a radius of curvature $R_1$, as shown in the exemplary embodiment. In other embodiments, the circumferential portion 72 may form a fully annular ring such that the first arcuate length $AL_1$ is a full circumference defined by the circumferential portion 72. In still other embodiments, the circumferential portion 72 may be semi-circular.

Each axial tab 74 extends from a first end 75 connected to the circumferential portion 72 to a second, free end 76. More specifically, in the exemplary embodiment, each axial tab 74 extends radially inwardly from the first end 75 to the second end 76. In other embodiments, axial tabs 74 may extend in any other suitable direction that enables the electric machine 300 to function as described herein. In the exemplary embodiment, the portion of the axial tab 74 adjacent to the first end 75 is substantially flush with the circumferential portion 72, and the portion of the axial tab 74 adjacent to the second end 76 is substantially perpendicular to the circumferential portion 72. In further embodiments, the first and second ends 75 and 76 may both be substantially flush with the circumferential portion 72, or the ends 75 and 76 may both extend substantially perpendicularly to the circumferential portion 72.

In the exemplary embodiment, each axial tab 74 is coupled to the axial portion 66 of one of the plurality of leads 64 such that each busbar 70 is electrically coupled to at least two leads 64. In other embodiments, the busbar 70 and leads 64 may be coupled together in any other suitable way, for example, by coupling the axial tab 74 to the radial portion 65 of the lead 64. In still further embodiments, the busbar 70 may not include any axial tabs 74, and the circumferential portion 72 is coupled directly to at least two leads 64. The busbar 70 may be brazed to each lead 64 or may be coupled in any other suitable manner. In the exemplary embodiment, a single busbar 70 is coupled to each lead 64. In other embodiments, more than one busbar 70 may be coupled to each lead 64.

Figure 7:
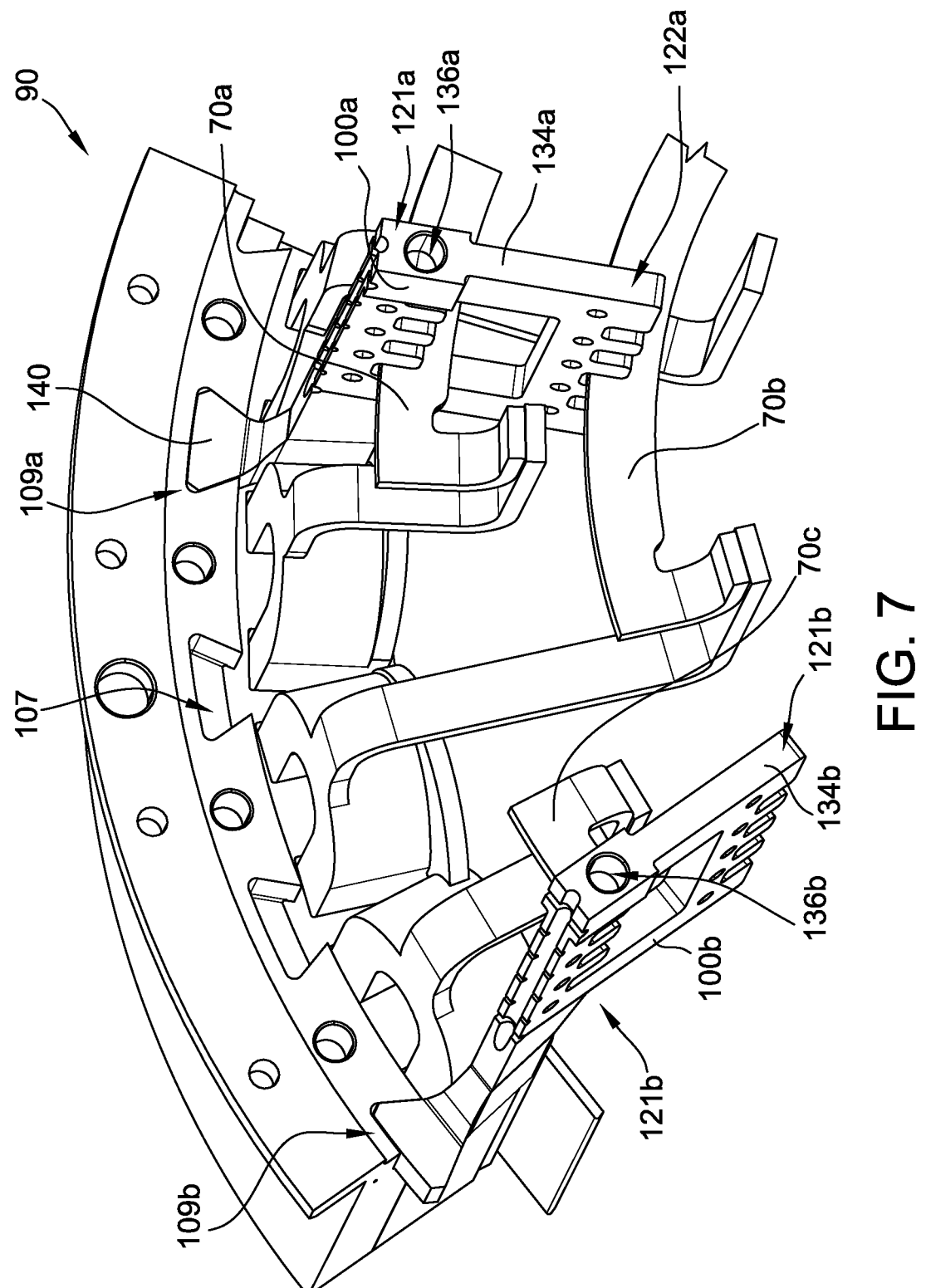
FIG. 7 is another perspective view of the exemplary wedge portion shown in FIG. 6 further illustrating a plurality of brackets.
Figure 8:
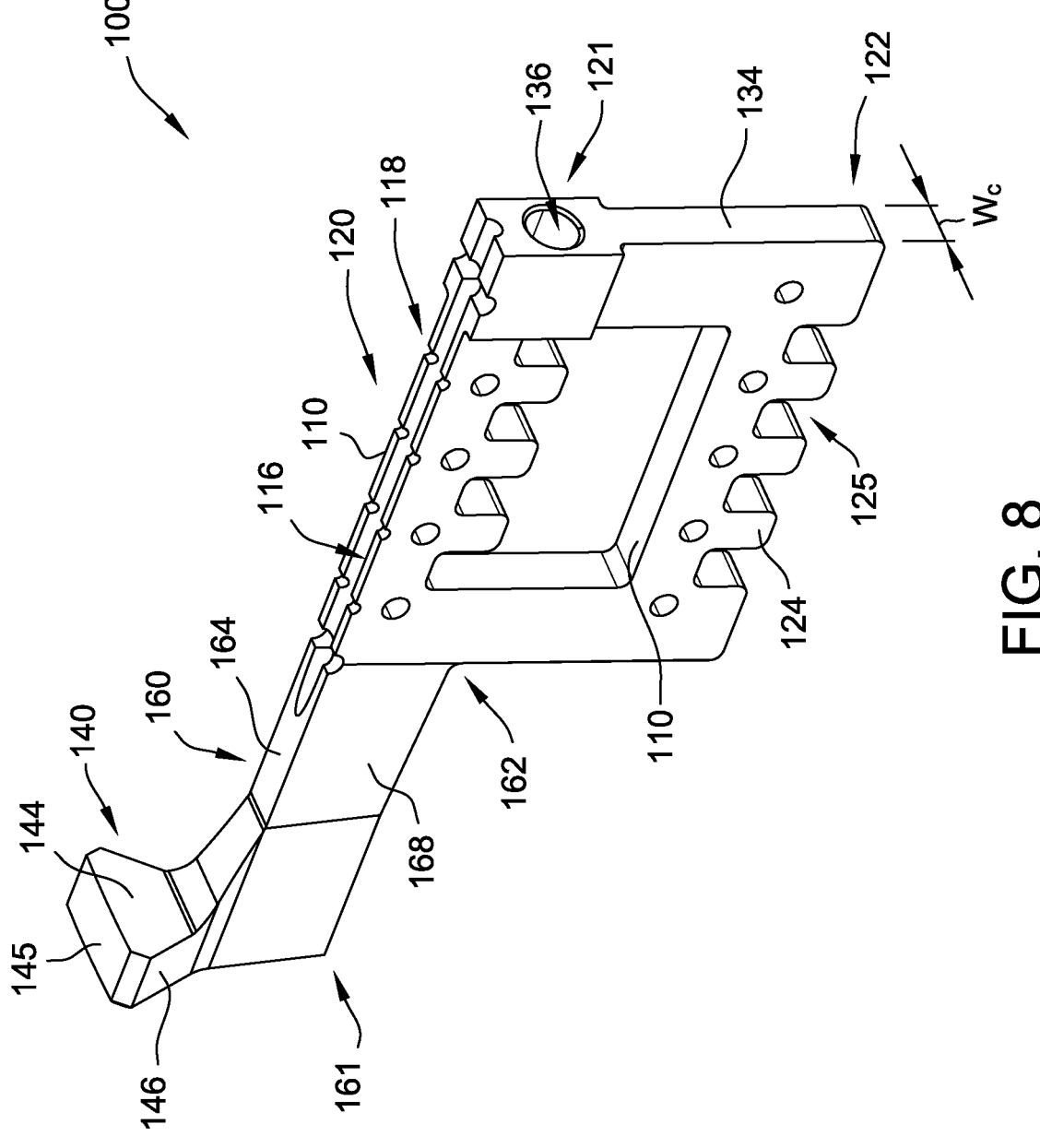
FIG. 8 is a perspective view of one of the plurality of brackets shown in FIG. 7.
Figure 9:
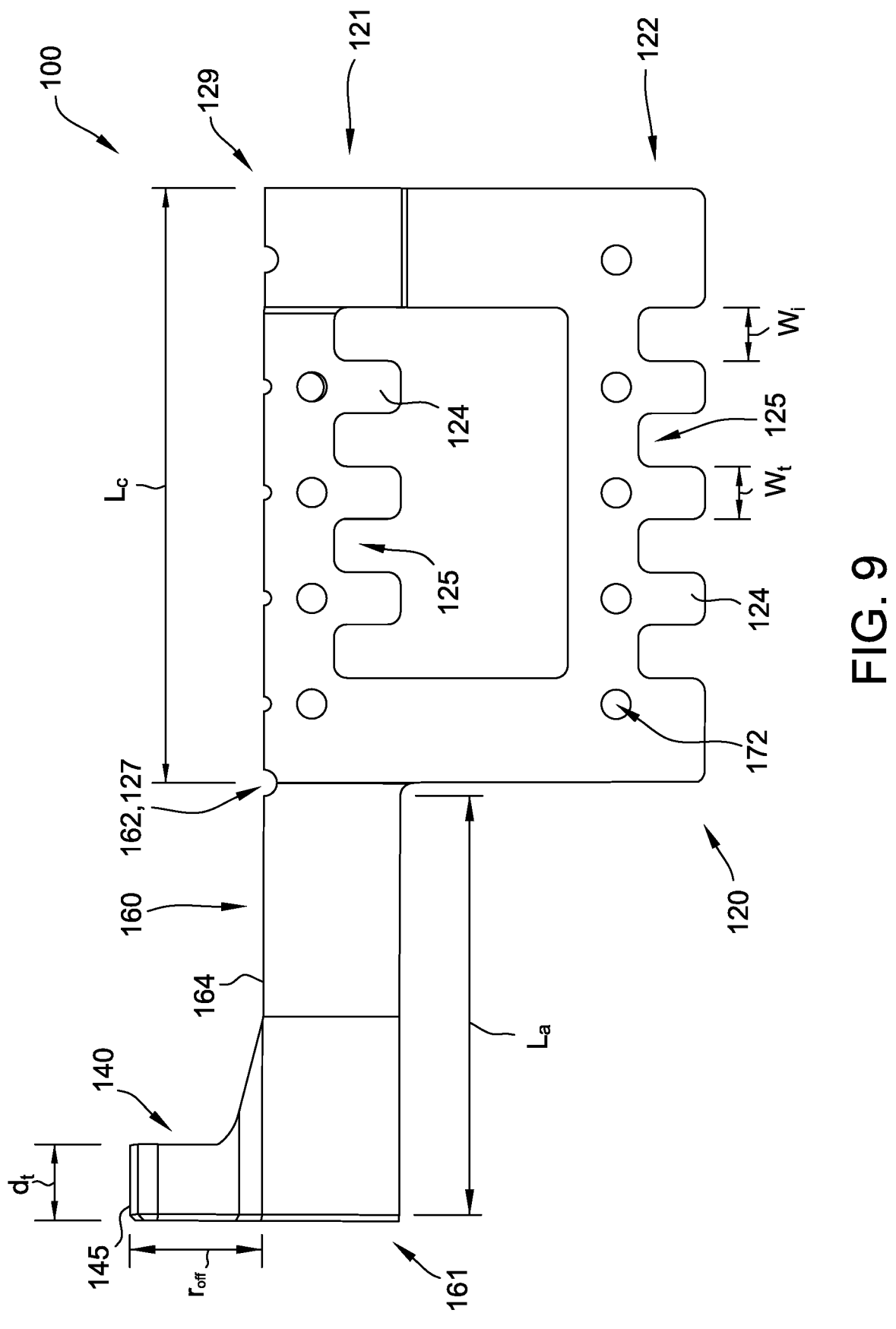
FIG. 9 is another perspective view of one of the plurality of brackets shown in FIG. 7.
Figure 10:
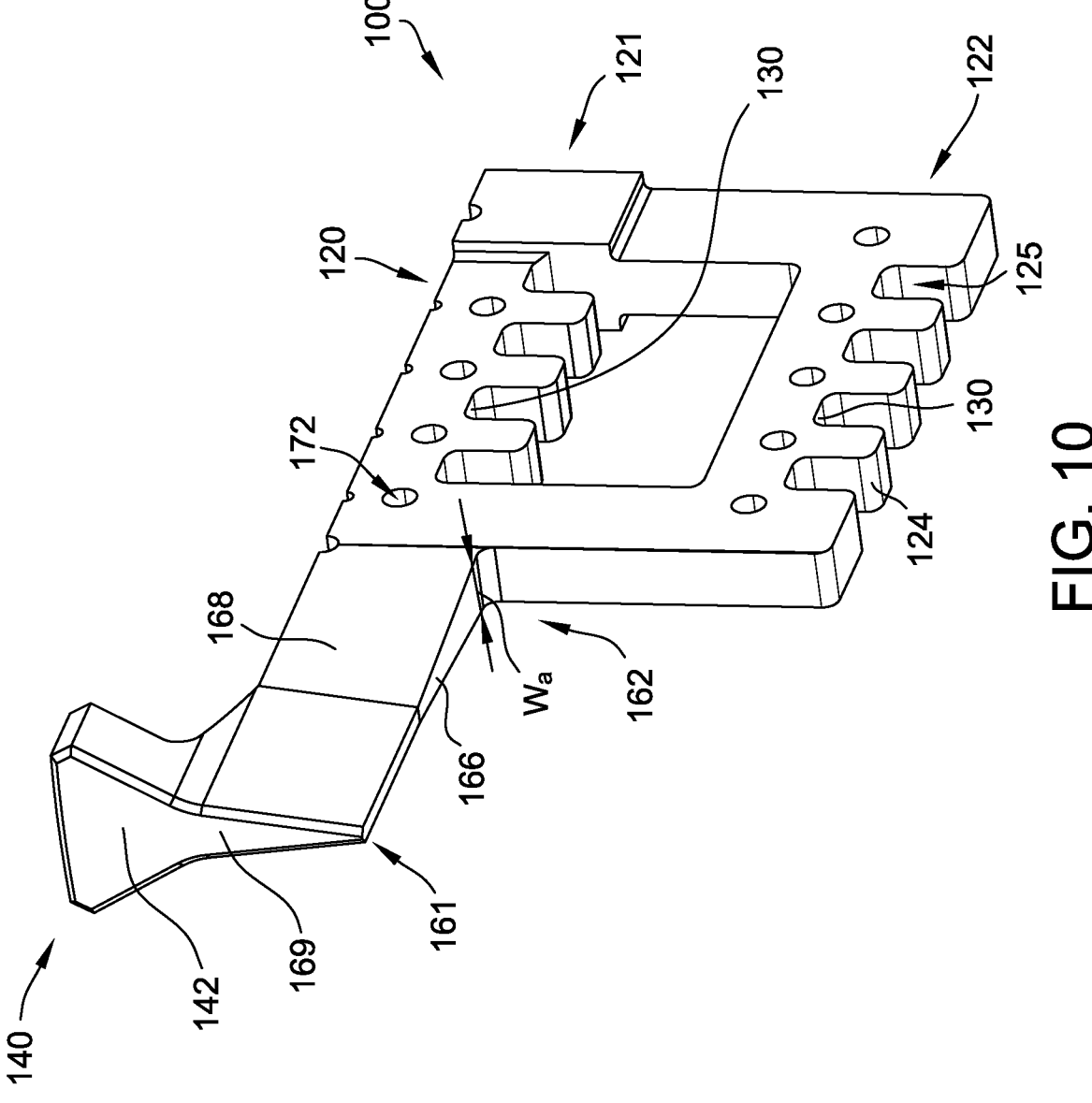
FIG. 10 is another perspective view of one of the plurality of brackets shown in FIG. 7.

With reference to FIG. 7, the electric machine 300 also includes at least one bracket 100 within one of the mounting recesses 109 (shown in FIG. 4) that provides mechanical support to the at least one busbar 70. In the exemplary embodiment, a first bracket 100a is received in a first mounting recess 109a, and a second bracket 100b is received in a second mounting recess 109b. With reference to FIGS. 8-10, each bracket 100 includes a comb portion 120, a tab 140, and an arm 160 that extends between the comb portion 120 and the tab 140 such that the comb portion 120 is offset from the tab 140. The comb portion 120 includes a plurality of teeth 124 arranged in at least one row. In the exemplary embodiment, each bracket 100 includes a first, upper row 121 of teeth 124 and a second, lower row 122 of teeth 124 that extends substantially parallel to the first row 121. In other embodiments, the comb portion 120 may include any other suitable number of rows, for example and without limitation, only one row of teeth 124, or more than three rows of teeth 124.

Each row 121 and 122 of teeth 124 extends a length $L_c$ from a first end 127 to a second end 129 of the comb portion 120. In the exemplary embodiment, each row 121 and 122 extends generally axially along the length $L_c$ and is substantially parallel to the central longitudinal axis 16. Moreover, each row 121 and 122 includes an upper surface 110 and a lower surface 130 that is substantially parallel to the upper surface 110. Furthermore, in the exemplary embodiment, the upper surface 110 and the lower surface 130 each have a width $w_c$ that is approximately the same as a width $w_c$ of the comb portion 120. In further embodiments, the upper and lower surfaces 110 and 130 may have different widths $w_{c,u}$ and $w_{c,l}$ (not shown) such that the comb portion 120 does not have a constant width. The comb portion 120 also includes an end surface 134 that is opposite the tab 140 and that extends substantially perpendicularly to the upper and lower surfaces 110 and 130 of the comb portion 120. A first outer aperture 136 is defined on the end surface 134 of each bracket 100 as described in more detail below.

Each of the plurality of teeth 124 extends substantially perpendicularly downward from the lower surface 130 of each row 121 and 122. An indentation 125 is defined between each pair of adjacent teeth 124. Each row 121 and 122 of the comb portion 120 includes at least two teeth 124 that define an indentation 125 therebetween. Each indentation 125 is sized and shaped to receive a portion of the busbar 70 therein. More specifically, in the exemplary embodiment, each indentation 125 is sized and shaped to receive part of the circumferential portion 72 of the busbar 70 therein. Accordingly, each indentation 125 has a width $w_i$ that is wider than the depth $d_1$ of the circumferential portion 72 of the busbar 70. Each tooth has a width $w_t$ that is determined at least in part by the voltage class of the electric machine 10 in order to provide the required electrical clearance and creepage distance between busbars 70 disposed in adjacent indentations 125.

Moreover, in the exemplary embodiment, not every indentation 125 of the bracket 100 receives a portion of a busbar 70. More specifically, in the exemplary embodiment, at least some indentations 125 may remain empty and not receive a portion of a busbar 70. For example, and with reference to FIG. 7, the first bracket 100a receives a portion of a first busbar 70a in an indentation 125 defined in an upper row 121a thereof, and a portion of a second busbar 70b is received in an indentation 125 defined in a lower row 122*b* thereof. Similarly, the second bracket 100*b* receives a portion of a third busbar 70*c* in an indentation 125 defined in an upper row 121*b* thereof. In the exemplary embodiment, no other indentations 125 receive a portion of a busbar 70.

Each row 121 and 122 of the bracket 100 may accommodate a busbar 70 having a different radius of curvature $R_c$. In the exemplary embodiment, the upper rows 121*a* and 121*b* of the first and second brackets 100*a* and 100*b* are circumferentially aligned along a first radius $R_1$ (not shown) such that the portions of the first and third busbars 70*a* and 70*c* received by indentations 125 in the upper rows 121*a* and 121*b* are formed with the same radius of curvature $R_1$. In some embodiments, the same busbar 70 may extend through indentations 125 formed in the upper rows 121*a* and 121*b* of both the first and second brackets 100*a* and 100*b*. Different indentations 125 formed in the same row 121 or 122 of the bracket may accommodate busbars 70 with the same radius of curvature.

Similarly, the lower rows 122*a* and 122*b* of the first and second brackets 100*a* and 100*b* are circumferentially aligned at a second radius $R_2$, and the second busbar 70*b* is received in an indentation 125 formed in the lower row 122*a* and, as such, are formed with the same second radius of curvature $R_2$. In some embodiments, the same busbar 70 may extend through indentations 125 formed in the lower rows 122*a* and 122*b* of both the first and second brackets 100*a* and 100*b*. In the exemplary embodiment, the second radius of curvature $R_2$ is different than, and is less than, the first radius of curvature $R_1$. In the exemplary embodiment, no other indentations 125 receive a portion of a busbar 70.

Each bracket 100 also includes a tab 140 formed with an interior face 142, an exterior face 144, an upper face 145, and a plurality of lateral faces 146. In the exemplary embodiment, the interior face 142 is substantially parallel to the exterior face 144, and the upper face 145 is substantially perpendicular to both the interior and exterior faces 142 and 144. In alternative embodiments, the interior, exterior, and upper faces 142, 144, and 145 may be formed with any other suitable orientation relative to one another. Each tab 140 is shaped and sized to be received within a respective mounting recess 109 in the stator core 18. For example, if the mounting recesses 109 are dovetail-shaped recesses, then the tab 140 is formed as a dovetail-shaped tab. That is, the tab 140 is formed with a shape that is substantially identical to the shape of the mounting recess 109 into which it is to be inserted. In alternative embodiments, any other suitable mechanical coupling feature may be used to couple the bracket 100 to the stator core 18.

With reference to FIG. 7, in the exemplary embodiment, each tab 140 is received in a mounting recess 109 such that the interior face 142 engages with the recessed surface 107 of the stator core 18, and such that each of the upper and lateral faces 145 and 146 engages with one of the plurality of recess sidewalls 108 defined within the stator core 18. In the exemplary embodiment, the exterior face 144 is substantially parallel to the exterior surface 105 of the stator core 18 when the tab 140 is inserted within the mounting recess 109. In other embodiments, the exterior face 144 of the tab 140 may be oriented obliquely relative to the exterior surface 105 of the stator core 18 when the tab 140 is installed in the mounting recess 109. In the exemplary embodiment, a depth $d_t$ of the tab 140 is greater than a depth $d_{mr}$ of the corresponding mounting recess 109 such that the exterior face 144 of the tab 140 extends axially beyond the exterior surface 105 of the stator core 18. In further embodiments, the depth $d_t$ of the tab 140 may be less than the depth $d_{mr}$ of the corresponding mounting recess 109 such that the exterior face 144 of the tab 140 remains within the mounting recess 109. In still further embodiments, the exterior face 144 of the tab 140 may be substantially flush with the exterior surface 105.

Each bracket 100 additionally includes an arm 160 that extends between the tab 140 and the comb portion 120. In the exemplary embodiment, each arm 160 has a length $L_a$ measured from a first end 161 adjacent to the interior face 142 of the tab 140 to a second end 162 adjacent to the first row 121 of teeth 124 in the comb portion 120. As best seen in FIG. 7, the arm 160 extends generally axially along its length $L_a$ in a direction substantially parallel to the central longitudinal axis 16. The arm 160 includes an upper surface 164, a lower surface 166 that is substantially parallel to the upper surface 164, and a pair of opposing lateral surfaces 168 extending between the upper and lower surfaces 164 and 166. The arm 160 also includes an interior surface 169 that is substantially flush with the interior face 142 of the tab 140.

Each tab 140 extends substantially perpendicularly from the upper surface 164 of the arm 160 adjacent to the first end 161 such that the interior and exterior faces 142 and 144 of the tab 140 are substantially perpendicular to the upper and lower surfaces 164 and 166 of the arm 160. In the exemplary embodiment shown in FIGS. 8 and 10, a width $w_a$ of the arm 160 adjacent to the second end 162 is approximately the same as the width $w_c$ of the comb portion 120, and the shape of the interior surface 169 is substantially similar to the shape of one of the partitions 33 (shown in FIG. 3). In further embodiments, the arm 160 may be formed with any suitable width or shape that enables the bracket 100 to function as described herein. With reference to FIG. 9, a radial offset $r_{off}$ is defined between the upper face 145 of the tab 140 and the upper surface 164 of the arm 160 such that the comb portion 120 is radially offset from the tab 140. With reference to FIG. 7, the tab 140 of each bracket 100 is received in one of the mounting recesses 109 such that the comb portion 120 of the bracket 100 extends longitudinally and is radially offset from the tab 140 by the radial offset $r_{off}$.

The bracket 100 also includes an instrumentation routing groove 116 defined along the upper surface 110 of the upper row 121 of teeth 124. In the exemplary embodiment, the instrumentation routing groove 116 extends along the entire length $L_c$ of the comb portion 120, and along part of the length $L_a$ of the arm 160. In some alternative embodiments, the instrumentation routing groove 116 may not extend into the arm 160, and/or may only extend along part of the length $L_c$ of the comb portion 120. The instrumentation routing groove 116 is shaped and sized to receive one or more sensors (not shown) therein such that the sensors extend generally axially through the electric machine 300. Such sensors may be, for example and without limitation, thermocouples or other temperature sensors. In the exemplary embodiment, the bracket 100 additionally includes at least one instrumentation turning groove 118 defined in the upper surface 110 of the upper row 121 of teeth 124. Each instrumentation turning groove 118 extends along the width $w_c$ of the upper surface 110 and at least partially intersects the instrumentation routing groove 116. In the exemplary embodiment, the bracket 100 includes six instrumentation turning grooves 118, but the bracket 100 may include any other suitable number of instrumentation turning grooves 118. Each instrumentation turning groove 118 is shaped and sized to at least partially receive one of the one or more sensors received in the instrumentation routing groove 116 such that the sensor can be rerouted from the axial direction to a circumferential direction. The exemplary embodiment illustrates grooves of two different sizes, but further embodiments may include only grooves of the same size, or grooves of multiple different sizes.

The bracket 100 also includes at least one restraining aperture 172 defined therein that extends through the width $w_c$ of the comb portion 120. Each restraining aperture 172 is shaped and sized to receive a restraining strap therein. In the exemplary embodiment, each row 122 of the comb portion 120 includes four restraining apertures 172, but each row 122 may include any other suitable number of restraining apertures 172, for example and without limitation, more than four restraining apertures 172 or less than four restraining apertures 172.

In the exemplary embodiment, each bracket 100 is constructed from a non-conductive, insulating material, for example and without limitation, Torlon® or Polyether ether ketone (PEEK). In other embodiments, the bracket 100 may be constructed from any other suitable lightweight, high-strength, electrically-insulating polymeric or composite material. Each bracket 100 may be manufactured by injection molding, machining, casting, additive manufacturing, or any other suitable process.

Figure 11:
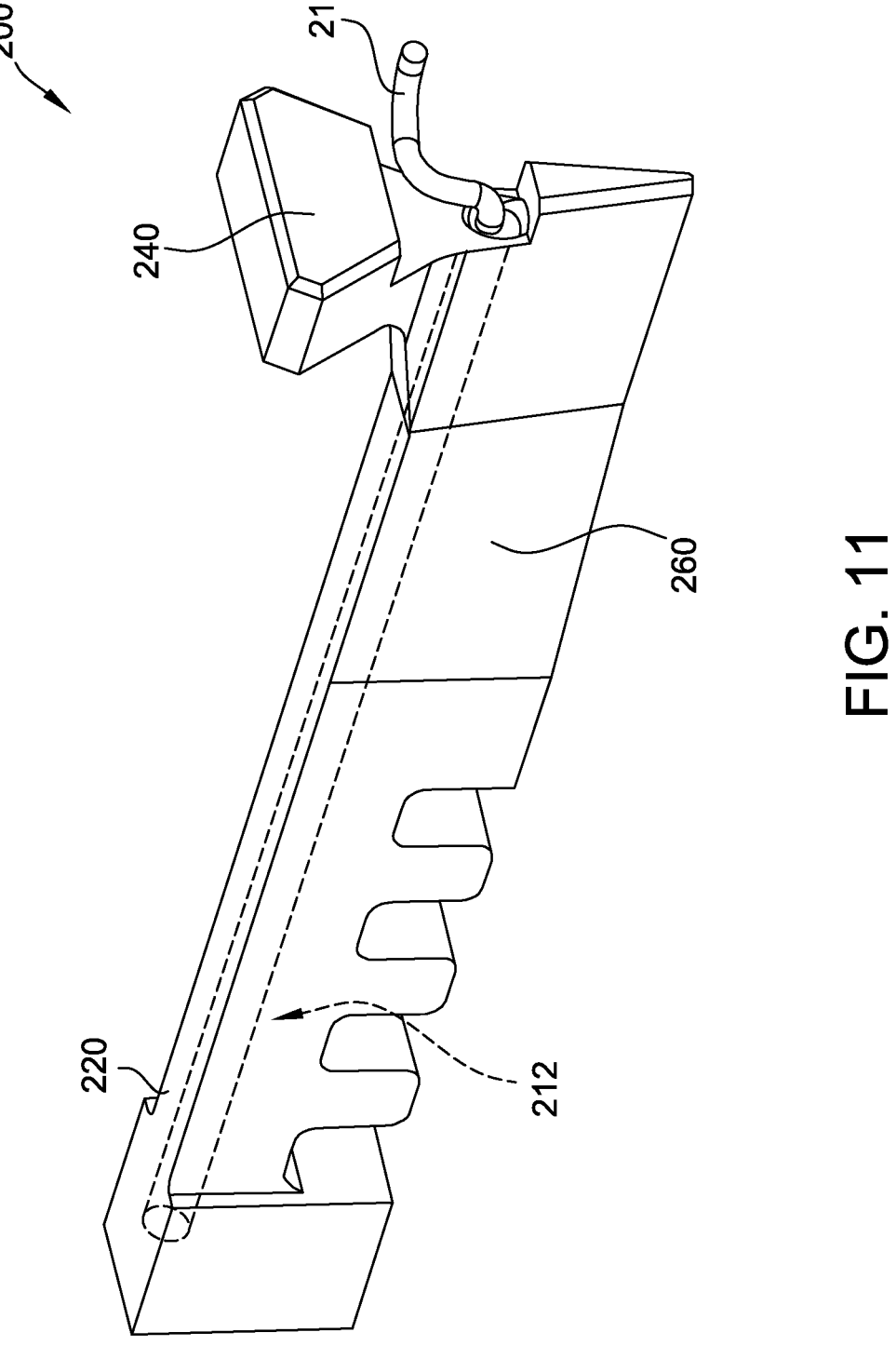
FIG. 11 is a perspective view of an alternative embodiment of a bracket.
Figure 12:
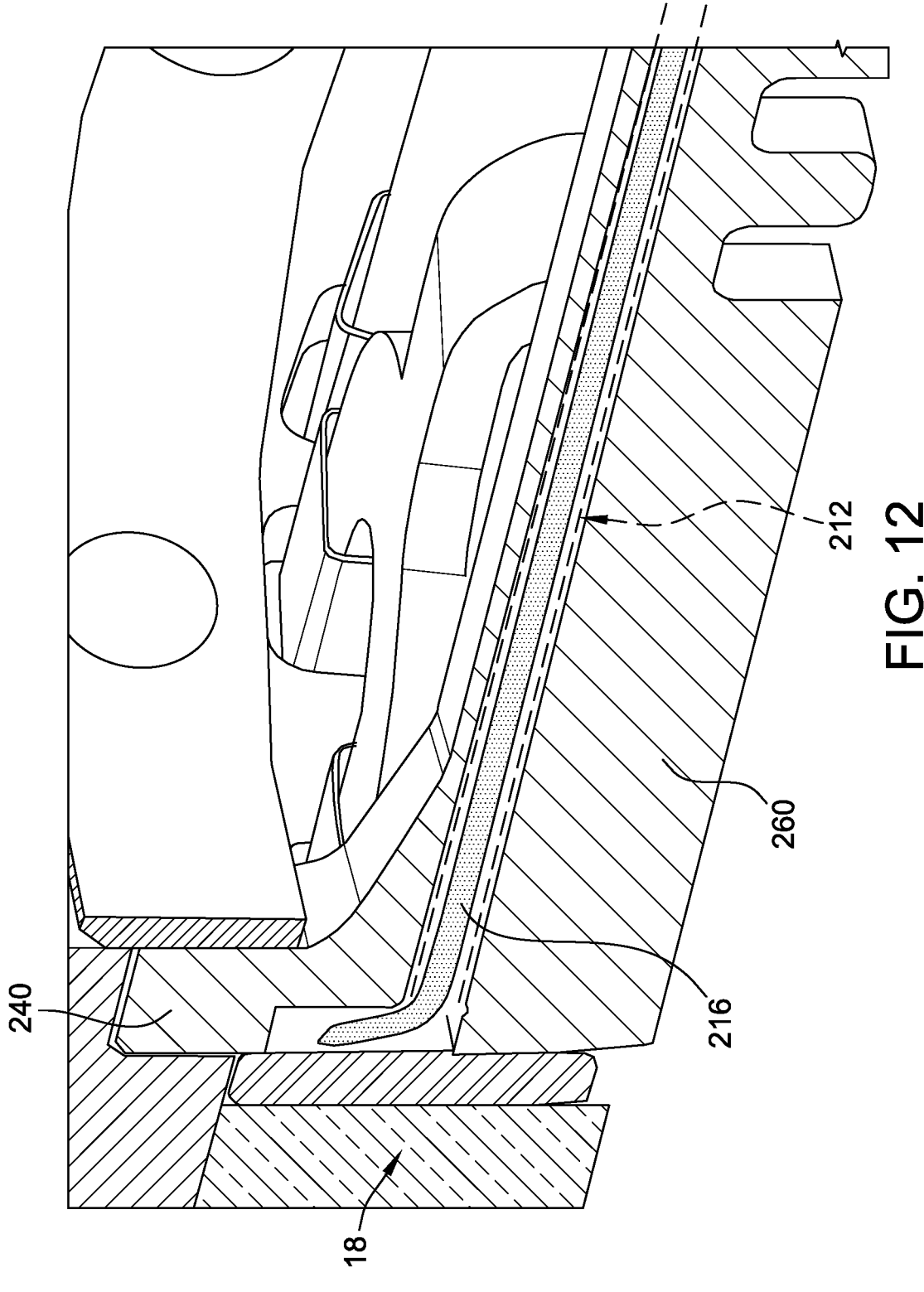
FIG. 12 is a cross-sectional view of the bracket shown in FIG. 11.

An alternative embodiment of a bracket 200 is illustrated in FIGS. 11-12. The bracket 200 includes a comb portion 220, a tab 240, and an arm 260 extending between the comb portion 220 and the tab 240. The bracket 200 additionally includes an instrumentation routing passage 212 extending along an axial length of the bracket 200. The instrumentation routing passage 212 is shaped and sized to receive a sensor lead wire 216 therethrough to permit passage of the stator lead wire 216 from the stator core 18 through the electric machine 300 in the axial direction.

Figure 13:
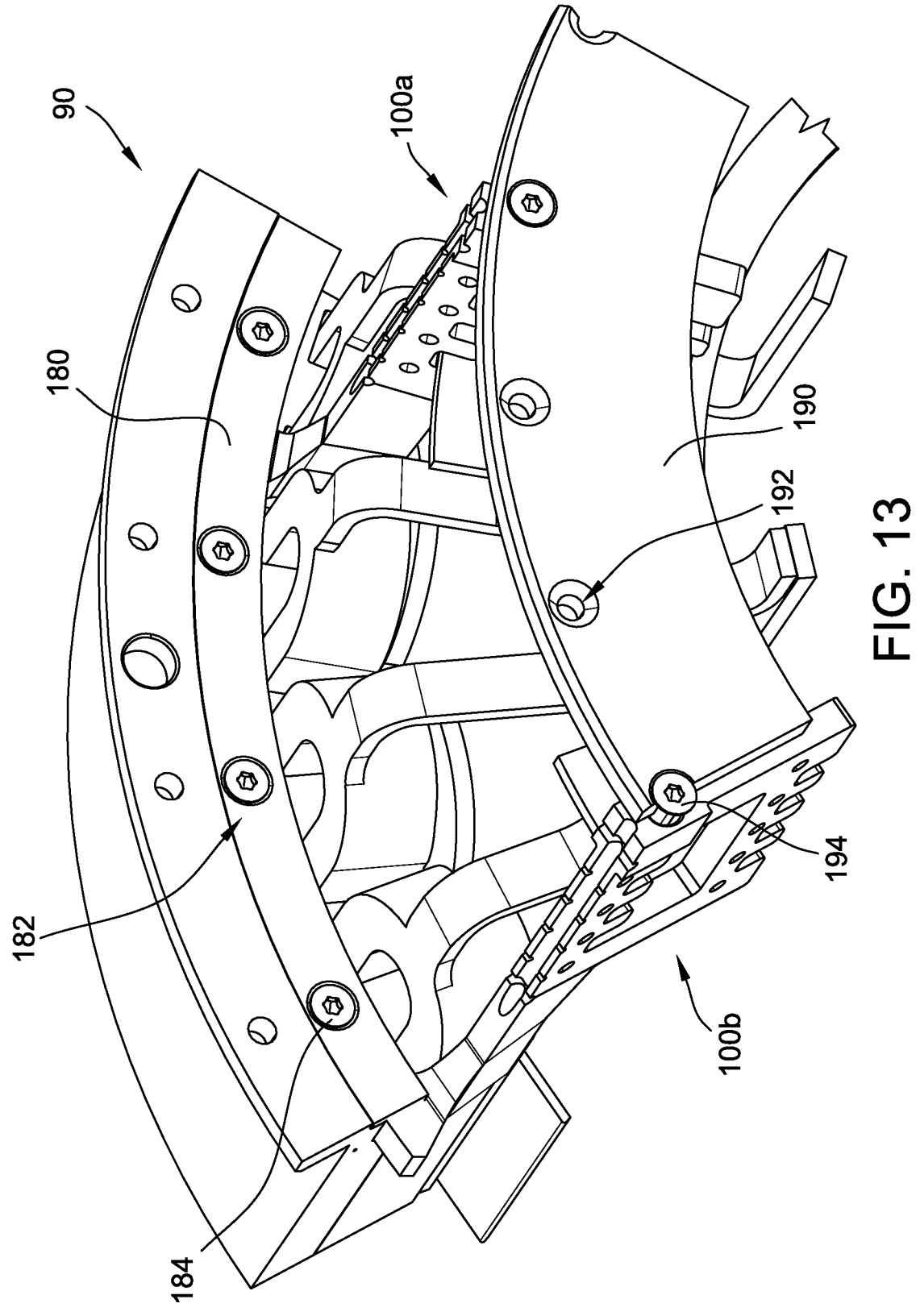
FIG. 13 is another perspective view of the exemplary wedge portion shown in FIG. 7 further illustrating an outer retaining ring.

In the exemplary embodiment, and with reference to FIG. 13, the electric machine 300 also includes an inner retaining ring 180 coupled to the exterior surface 105 of the stator core 18. The inner retaining ring 180 includes a plurality of circumferentially-spaced second apertures 182 defined therein. The second apertures 182 are arranged such that each second aperture 182 may be axially aligned with a first aperture 102 of the stator core 18 when the inner retaining ring 180 is coupled thereto. The first and second apertures 102 and 182 are shaped and sized to receive a fastener 184 therethrough to secure the inner retaining ring 180 to the exterior surface 105 of the stator core 18. In some embodiments, the portion of the inner retaining ring 180 defining each second aperture 182 may be chamfered or countersunk such that a head of each fastener is substantially flush with the inner retaining ring 180 when fully installed in the stator core 18.

With further reference to FIG. 13, the electric machine 300 additionally includes an outer retaining ring 190. In the exemplary embodiment, the outer retaining ring 190 is coupled to and extends arcuately between a first end surface 134a of the first bracket 100a and a second end surface 134b of the second bracket 100b. The outer retaining ring 190 defines a plurality of outer retaining apertures 192 spaced circumferentially therearound. The outer retaining apertures 192 are arranged such that the first outer aperture 136a defined on the first bracket 100a and the second outer aperture 136b defined on the second bracket 100b are each aligned with one of the plurality of outer retaining apertures 192. The outer apertures 136a and 136b and the outer retaining apertures 192 are shaped and sized to receive a fastener 194 therethrough to secure the outer retaining ring 190 to the first and second brackets 100a and 100b.

Figure 14:
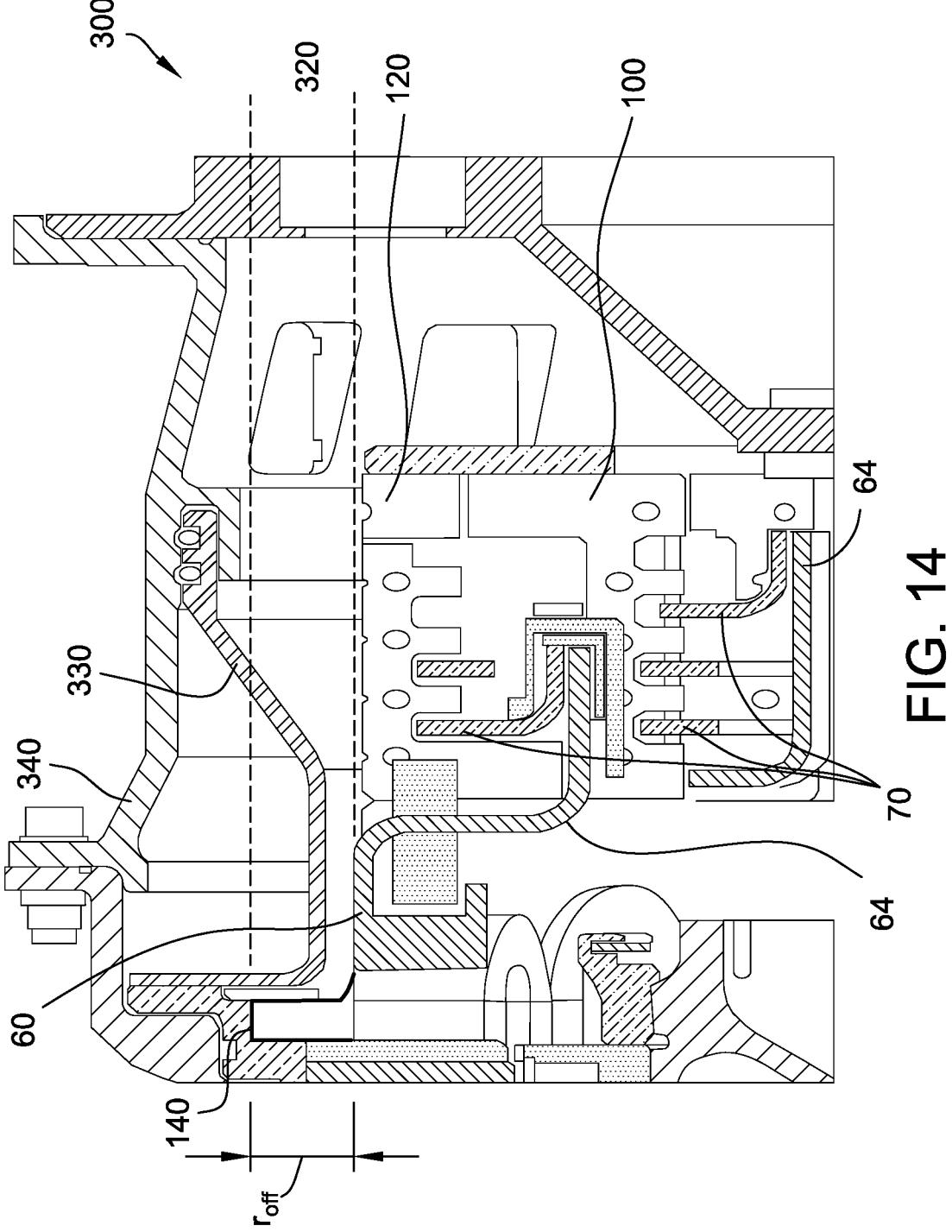
FIG. 14 is a partial cross-sectional view of the electric machine shown in FIG. 1 taken along line 14-14.

FIG. 14 is a partial cross-sectional view of the electric machine with at least one bracket 100 installed therein. An annular open region 320 extends axially through the electric machine 300 and is defined in part by the radial offset ruff between the tab 140 and the comb portion 120. The open region 320 is created by the radial offset $r_{off}$ between the tab 140 and the comb portion 120. That is, the open region 320 represents the radial space that would otherwise have been occupied by the comb portions 120 of the plurality of brackets 100 if the brackets 100 did not include a radial offset $r_{off}$. Shifting the comb portion 120 radially inward into the space already occupied by the plurality of busbars 70 enables the most efficient use of the radial space in which the busbars 70 and end windings 64 reside. In the exemplary embodiment, the open region 320 is used to house an impingement cooling manifold plenum 310 for use in cooling the end winding portions 60. In alternative embodiments, no additional components are placed in the open region 320, and the electric machine 300 may be constructed with a smaller housing 340 to reduce the overall size and weight of the electric machine 300.

In an alternative embodiment of the electric machine 10, the exterior surface 105 of the stator core 18 is aligned substantially coaxially with the radial inner surface 36 of the stator core 18. Each tab 140 of each bracket 100 is received in a respective mounting recess 109 such that the comb portion 120 of the bracket 100 extends radially outward from the stator core 18 and is longitudinally offset from the tab 140. The longitudinal offset between the tab 140 and the comb portion 120 facilitates reducing the axial space required by the busbars 70 and brackets 100, thereby creating space for other components, or enabling the axial extent of the electric machine 10 to be reduced.

An exemplary method of assembling the electric machine 300 described herein includes positioning a tab 140 extending from a bracket 100 within a mounting recess 109 defined in an exterior surface 105 of a stator core 18. A portion of a busbar 70 is then inserted within one of a plurality of indentations 125 of a comb portion 120 of the bracket 100, which is offset from the tab 140. A stator winding 40 is coupled to a radial inner surface 36 of the stator core 18, and the busbar 70 is coupled to a lead 64 extending from an end winding portion 60 of a stator winding 40.

In embodiments in which the exterior surface 105 of the stator core 18 is oriented substantially perpendicularly to the radial inner surface 36 of the stator core 18, positioning the tab 140 of the bracket 100 within the mounting recess 109 includes positioning the tab 140 in the mounting recess 109 such that the comb portion 120 of the bracket 100 extends longitudinally and is radially offset from the tab 140. In some embodiments in which the exterior surface 405 of the stator core 18 is oriented substantially coaxially with the radial inner surface 36 of the stator core 18, as shown and described with reference to FIG. 15, positioning the tab 140 of the bracket 100 within the mounting recess 409 includes positioning the tab 140 in the mounting recess 409 such that the comb portion 120 of the bracket 100 extends radially and is longitudinally offset from the tab 140.

In embodiments in which the busbar 70 includes a first busbar 70a having a first radius of curvature $R_1$ and a second busbar 70b having a second radius of curvature $R_2$ that is different than the first radius of curvature $R_1$, and in which the plurality of teeth 124 of the comb portion 120 are arranged in at least a first, upper row 121a and a second, lower row 122a that is substantially parallel to the first row 121a, the method further includes inserting a portion of the second busbar 70b within an indentation 125 of the second row 122a of the comb portion 120.

In embodiments in which the exterior surface 105 of the stator core 18 includes a plurality of first apertures 102 defined therein and the inner retaining ring 180 defines a plurality of second apertures 182, the method further includes coupling the inner retaining ring 180 to the exterior surface 105 such that the first apertures 102 and second apertures 182 are aligned to receive a fastener therethrough, and inserting a plurality of fasteners through the plurality of first and second apertures 102 and 182 to secure the inner retaining ring 180 to the exterior surface 105 of the stator core 18.

In embodiments in which the bracket 100 further includes an instrumentation routing groove 116 defined on the upper surface 110 and extending along the length $L_c$ of the comb portion 120, the method further includes inserting a portion of a sensor (not shown) within the instrumentation routing groove 116.

Embodiments of the electric machines and brackets described herein provide several advantages over prior designs. The offset between the tab and comb portion enables the brackets to be installed within the same physical envelope as the busbars, thereby creating radial or axial space to install other components or to reduce the radial or axial extent of the machine. In the exemplary embodiment, the radial space created by the radial offset of the bracket is occupied by an annular impingement cooling plenum, which supplies cooling air through a plurality of small impingement slots to facilitate cooling the end windings. If the brackets were constructed without a radial offset, and the comb portion instead extended substantially axially from the tab, the brackets would radially interfere with an annular plenum. In such cases, the plenum must be constructed with different inner radii around its circumference in order to achieve the required proximity to the end windings without interfering with the brackets. A component with such complex geometry would be far more difficult and expensive to manufacture than the annular plenum enabled by the radially offset bracket.

Furthermore, the dovetail shape of the tab prevents movement of the bracket in the radial and circumferential directions; thus, the brackets may be installed one-by-one with no attachment hardware required until the end of assembly. The inner retaining ring fully secures the tab in the mounting recess without passing any fasteners through the tab itself, improving its mechanical integrity. A fastener hole defined in the tab would need to be countersunk in order to prevent a head of the fastener from interfering with other machine components, further impacting the tab's mechanical integrity. Passing fasteners through only the inner retaining ring and the stator core also advantageously separates the conductive ground plane of metallic hardware from the non-conductive bracket.

Additionally, the same bracket design may be used in electric machines with varied configurations, including those with differently-oriented end winding leads and busbars. In the exemplary embodiments of FIGS. 3-7 and 13-14, the end windings extend substantially axially from the stator core, and the bracket provides a radial offset to reduce the radial space occupied by the busbars and brackets. In the exemplary embodiment of FIG. 15, the end windings extend substantially radially from the stator core, and the bracket provides an axial offset to reduce the axial space occupied by the busbars and brackets.

Finally, constructing the bracket from a non-conductive material reduces the electrical clearance required between busbars, allowing them to be installed closer together and reducing the size requirements of the electric machine as a whole.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

Further aspects of the invention are provided by the subject matter of the following clauses:

1. An electrical machine comprising: a rotor; a stator magnetically coupled to said rotor, said stator comprising: a stator core comprising an exterior surface and a plurality of circumferentially-spaced mounting recesses defined therein; a plurality of stator windings coupled to a radial inner surface of said stator core, each stator winding comprising: an end winding portion extending outward from an axial end of said stator core; and at least one lead extending from said end winding portion; at least one busbar electrically coupled to at least two of said leads; and a bracket comprising: a comb portion comprising a plurality of teeth arranged in at least one row such that an indentation is defined between each pair of adjacent teeth, each of said indentations sized to receive a portion of said busbar therein; a tab sized and shaped to be received within a respective one of said plurality of mounting recesses; and an arm extending between said comb portion and said tab such that said comb portion is offset from said tab.

2. The electrical machine of clause 1, wherein said stator core exterior surface extends substantially perpendicularly to said radial inner surface, and wherein said bracket tab is received in one of said mounting recesses defined on said stator core exterior surface such that said comb portion is radially offset from said tab.

3. The electrical machine of any preceding clause, wherein said stator core exterior surface is aligned substantially coaxially with said radial inner surface, and wherein said bracket tab is received in one of said mounting recesses such that said comb portion of said bracket extends radially and is longitudinally offset from said tab.

4. The electrical machine of any preceding clause, wherein said at least one busbar comprises a first busbar and a second busbar, said first busbar having a first radius of curvature, said second busbar being formed with a second radius of curvature that is different than the first radius of curvature of said first busbar.

5. The electrical machine of any preceding clause, wherein said tab is dovetail-shaped, and wherein each of said plurality of mounting recesses is dovetail-shaped.

6. The electrical machine of any preceding clause, wherein said stator core exterior surface further comprises a plurality of first apertures defined therein, wherein said electric machine further comprises an inner retaining ring defining a plurality of second apertures, and wherein said inner retaining ring is coupled to said exterior surface such that said first apertures are substantially aligned with said second apertures.

7. The electrical machine of any preceding clause, wherein said bracket comprises a first bracket disposed in a first of said plurality of mounting recesses, wherein said first bracket defines a first outer aperture on a first end surface opposite said tab, and wherein said electrical machine further comprises: a second bracket disposed in a second of said plurality of mounting recesses, said second bracket defining a second outer aperture on a second end surface opposite said second bracket; and an outer retaining ring defining a plurality of outer retaining apertures, said outer retaining ring extending arcuately between said first end surface and said second end surface.

8. A bracket connectable to a stator core of an electrical machine, said bracket comprising: a comb portion comprising a plurality of teeth arranged in at least one row such that an indentation is defined between each pair of adjacent teeth, each of said indentations sized to receive a portion of an electrical busbar therein; a tab sized and shaped to be received within a mounting recess defined in the stator core; and an arm extending between said comb portion and said tab such that said comb portion is offset from said tab.

9. The bracket of clause 8, wherein said bracket is constructed from a non-conductive material.

10. The bracket of any preceding clause, wherein said at least one busbar comprises a first busbar and a second busbar, said first busbar having a first radius of curvature, wherein said plurality of teeth of said comb portion are arranged in at least a first row and a second row that is substantially parallel to said first row, each indentation of said second row being sized to receive a portion of a second busbar therein, the second busbar formed with a second radius of curvature that is different than the first radius of curvature of said first busbar.

11. The bracket of any preceding clause, wherein said bracket comprises an instrumentation routing groove defined on an upper surface thereof and extending along a length of said comb portion.

12. The bracket of any preceding clause, wherein said bracket further comprises at least one instrumentation turning groove defined on said upper surface of said bracket, said instrumentation turning groove extending along a width of said comb portion and at least partially intersecting said instrumentation routing groove.

13. The bracket of any preceding clause, wherein said tab is dovetail-shaped.

14. The bracket of any preceding clause, wherein said bracket further defines at least one restraining aperture extending through said comb portion, each restraining aperture sized and shaped to receive a strap therethrough.

15. A method of assembling an electric machine including a rotor, a stator, a busbar, and a bracket, said method comprising: positioning a tab of the bracket within a mounting recess defined in an exterior surface of a stator core of the stator, wherein the bracket includes a comb portion offset from the tab and having a plurality of teeth arranged in at least one row such that an indentation is defined between each pair of adjacent teeth; inserting a portion of the busbar within one of the plurality of indentations; coupling a stator winding to a radial inner surface of the stator core; and coupling the busbar to a lead extending from an end winding portion of the stator winding.

16. The method of clause 15, wherein the exterior surface of the stator core is oriented substantially perpendicularly to the radial inner surface of the stator core, wherein positioning a tab of the bracket within a mounting recess comprises positioning the tab in the mounting recess such that the comb portion of the bracket is radially offset from the tab.

17. The method of any preceding clause, wherein the exterior surface of the stator core is oriented substantially coaxially with the radial inner surface of the stator core, wherein positioning a tab of the bracket within a mounting recess comprises positioning a tab in the mounting recess such that the comb portion of the bracket is longitudinally offset from the tab.

18. The method of any preceding clause, wherein the busbar comprises a first busbar and a second busbar, the first busbar having a first radius of curvature, wherein the plurality of teeth of the comb portion are arranged in at least a first row and a second row that is substantially parallel to the first row, wherein said method further comprises inserting a portion of the second busbar within an indentation of the second row of the comb portion, the second busbar formed with a second radius of curvature that is different than the first radius of curvature of the first busbar.

19. The method of any preceding clause, wherein the stator core exterior surface comprises a plurality of first apertures defined therein, said method further comprising: coupling an inner retaining ring to the exterior surface, the inner retaining ring defining a plurality of second apertures, such that the first apertures and the second apertures are aligned to receive a fastener therethrough; and inserting a plurality of fasteners through the plurality of first and second apertures to secure the inner retaining ring to the stator core exterior surface.

20. The method of any preceding clause, wherein the bracket further comprises an instrumentation routing groove defined on an upper surface thereof, the instrumentation routing groove extending along a length of the comb portion, said method further comprising inserting a portion of a sensor within the instrumentation routing groove.

What is claimed is:
1. An electrical machine comprising:
a rotor;
a stator magnetically coupled to said rotor, said stator comprising:
a stator core comprising an exterior surface and a plurality of circumferentially-spaced mounting recesses defined therein;

a plurality of stator windings coupled to a radial inner surface of said stator core, each stator winding comprising:

an end winding portion extending outward from an axial end of said stator core; and at least one lead extending from said end winding portion;

at least one busbar electrically coupled to at least two of said leads; and a bracket comprising:

a comb portion comprising a plurality of teeth arranged in at least two rows such that an indentation is defined between each pair of adjacent teeth, each of said indentations sized to receive a portion of said busbar therein, wherein each of the at least two rows of the plurality of teeth are aligned with one another in a radial direction and are spaced apart from one another in the radial direction;

a tab sized and shaped to be received within a respective one of said plurality of mounting recesses; and an arm extending between said comb portion and said tab such that said comb portion is offset from said tab.

2. The electrical machine of claim 1, wherein said stator core exterior surface extends substantially perpendicularly to said radial inner surface, and wherein said bracket tab is received in one of said mounting recesses defined on said stator core exterior surface such that said comb portion is radially offset from said tab.

3. The electrical machine of claim 1, wherein said stator core exterior surface is aligned substantially coaxially with said radial inner surface, and wherein said bracket tab is received in one of said mounting recesses such that said comb portion is longitudinally offset from said tab.

4. The electrical machine of claim 1, wherein said at least one busbar comprises a first busbar and a second busbar, said first busbar having a first radius of curvature, said second busbar being formed with a second radius of curvature that is different than the first radius of curvature of said first busbar.

5. The electrical machine of claim 1, wherein said tab is dovetail-shaped, and wherein each of said plurality of mounting recesses is dovetail-shaped.

6. The electrical machine of claim 1, wherein said stator core exterior surface further comprises a plurality of first apertures defined therein, wherein said electric machine further comprises an inner retaining ring defining a plurality of second apertures, and wherein said inner retaining ring is coupled to said exterior surface such that said first apertures are substantially aligned with said second apertures.

7. The electrical machine of claim 1, wherein said bracket comprises a first bracket disposed in a first of said plurality of mounting recesses, wherein said first bracket defines a first outer aperture on a first end surface opposite said tab, and wherein said electrical machine further comprises:

a second bracket disposed in a second of said plurality of mounting recesses, said second bracket defining a second outer aperture on a second end surface opposite said second bracket; and an outer retaining ring defining a plurality of outer retaining apertures, said outer retaining ring extending arcuately between said first end surface and said second end surface.

8. A bracket connectable to a stator core of an electrical machine, said bracket comprising:

a comb portion comprising a plurality of teeth arranged in at least two rows such that an indentation is defined between each pair of adjacent teeth, each of said indentations sized to receive a portion of an electrical busbar therein, wherein each of the at least two rows of the plurality of teeth are aligned with one another in a radial direction and are spaced apart from one another in the radial direction;

a tab sized and shaped to be received within a mounting recess defined in the stator core; and an arm extending between said comb portion and said tab such that said comb portion is offset from said tab.

9. The bracket of claim 8, wherein said bracket is constructed from a non-conductive material.

10. The bracket of claim 8, wherein said at least one busbar comprises a first busbar and a second busbar, said first busbar having a first radius of curvature, wherein said plurality of teeth of said comb portion are arranged in at least a first row and a second row that is radially aligned with said first row, each indentation of said second row being sized to receive a portion of a second busbar therein, the second busbar formed with a second radius of curvature that is different than the first radius of curvature of said first busbar.

11. The bracket of claim 8 further comprising an instrumentation routing groove defined on an upper surface thereof and extending along a length of said comb portion.

12. The bracket of claim 11 further comprising at least one instrumentation turning groove defined on said upper surface of said bracket, said instrumentation turning groove extending along a width of said comb portion and at least partially intersecting said instrumentation routing groove.

13. The bracket of claim 8, wherein said tab is dovetail-shaped.

14. The bracket of claim 8, wherein said bracket further defines at least one restraining aperture extending through said comb portion, each restraining aperture sized and shaped to receive a strap therethrough.

15. A method of assembling an electric machine including a rotor, a stator, a busbar, and a bracket, said method comprising:

positioning a tab of the bracket within a mounting recess defined in an exterior surface of a stator core of the stator, wherein the bracket includes a comb portion offset from the tab and having a plurality of teeth arranged in at least two rows such that an indentation is defined between each pair of adjacent teeth, wherein each of the at least two rows of the plurality of teeth are aligned with one another in a radial direction and are spaced apart from one another in the radial direction;

inserting a portion of the busbar within one of the plurality of indentations;

coupling a stator winding to a radial inner surface of the stator core; and coupling the busbar to a lead extending from an end winding portion of the stator winding.

16. The method of claim 15, wherein the exterior surface of the stator core is oriented substantially perpendicularly to the radial inner surface of the stator core, wherein positioning a tab of the bracket within a mounting recess comprises positioning the tab in the mounting recess such that the comb portion of the bracket is radially offset from the tab.

17. The method of claim 15, wherein the exterior surface of the stator core is oriented substantially coaxially with the radial inner surface of the stator core, wherein positioning a tab of the bracket within a mounting recess comprises positioning a tab in the mounting recess such that the comb portion of the bracket is longitudinally offset from the tab.

18. The method of claim 15, wherein the busbar comprises a first busbar and a second busbar, the first busbar having a first radius of curvature, wherein the plurality of teeth of the comb portion are arranged in at least a first row and a second row that is radially aligned with the first row, wherein said method further comprises inserting a portion of the second busbar within an indentation of the second row of the comb portion, the second busbar formed with a second radius of curvature that is different than the first radius of curvature of the first busbar.

19. The method of claim 15, wherein the stator core exterior surface comprises a plurality of first apertures defined therein, said method further comprising:

coupling an inner retaining ring to the exterior surface, the inner retaining ring defining a plurality of second apertures, such that the first apertures and the second apertures are aligned to receive a fastener therethrough; and inserting a plurality of fasteners through the plurality of first and second apertures to secure the inner retaining ring to the stator core exterior surface.

20. The method of claim 15, wherein the bracket further comprises an instrumentation routing groove defined on an upper surface thereof, the instrumentation routing groove extending along a length of the comb portion, said method further comprising inserting a portion of a sensor within the instrumentation routing groove.

\* \* \* \* \*